July 5, 1927.
A. E. COOK
1,634,932
AUTO MARINE VEHICLE
Filed Aug. 17. 1925
7 Sheets-Sheet 1
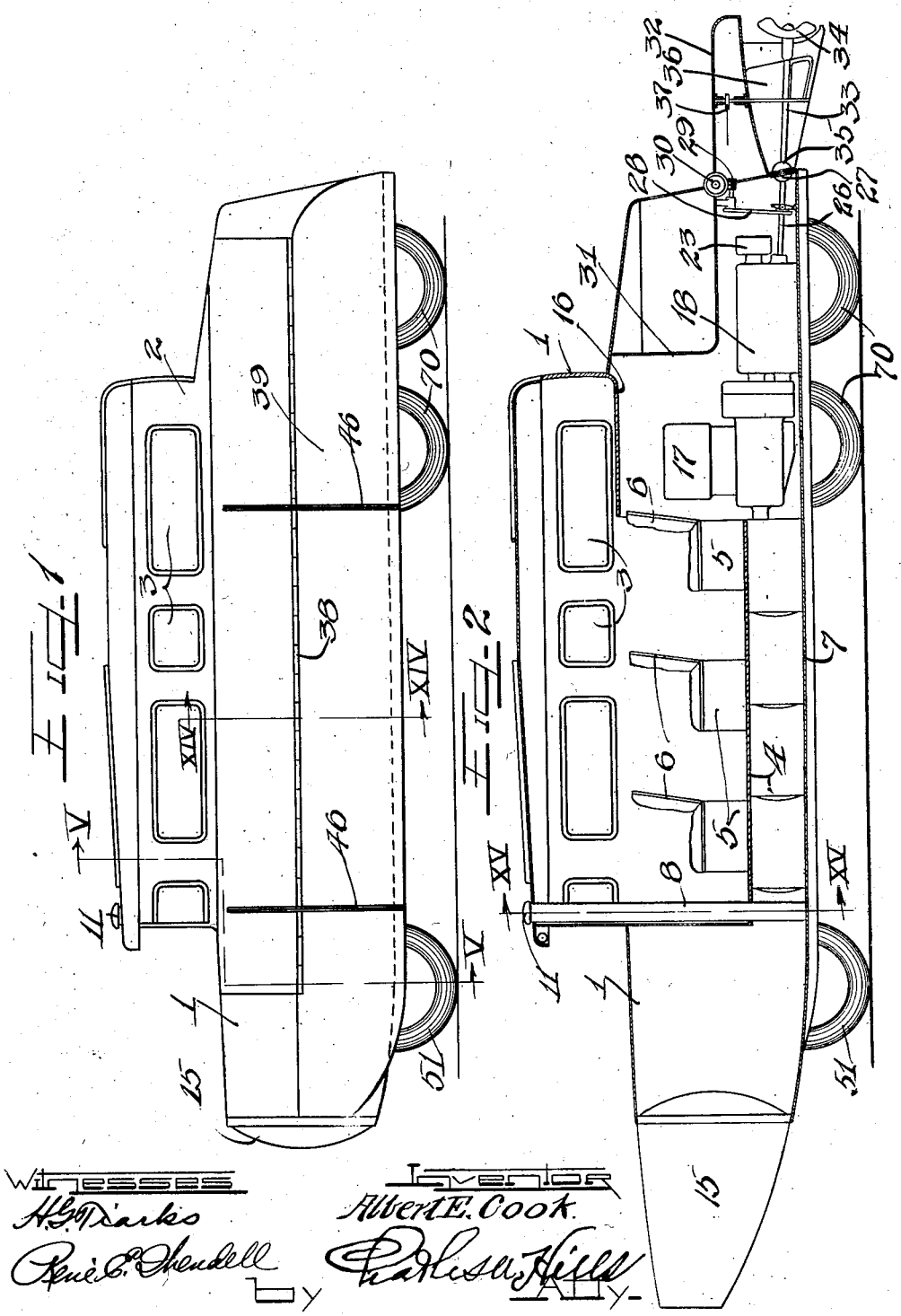

July 5, 1927.
A. E. COOK
1,634,932
AUTO MARINE VEHICLE
Filed Aug. 17, 1925
7 Sheets-Sheet 2
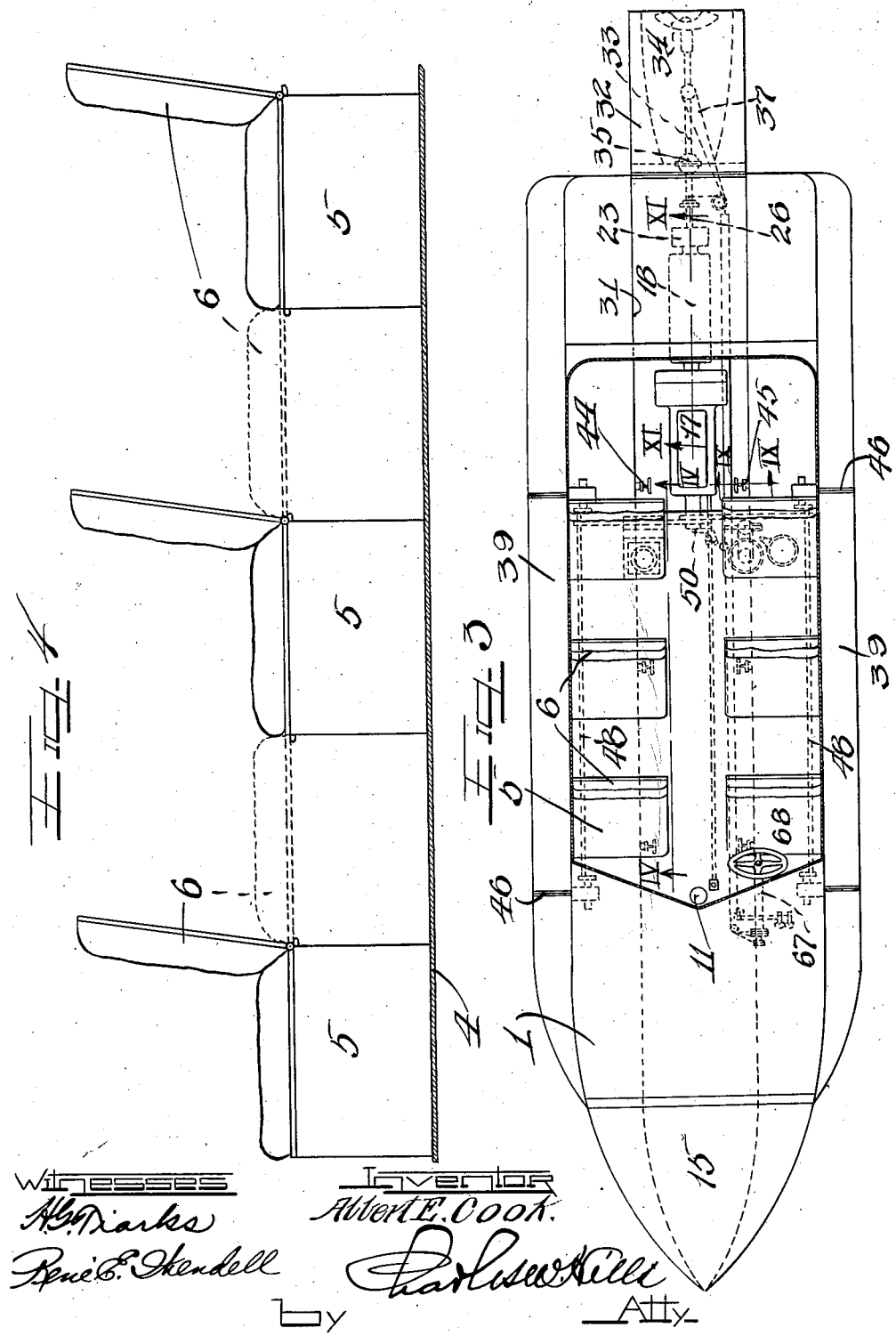

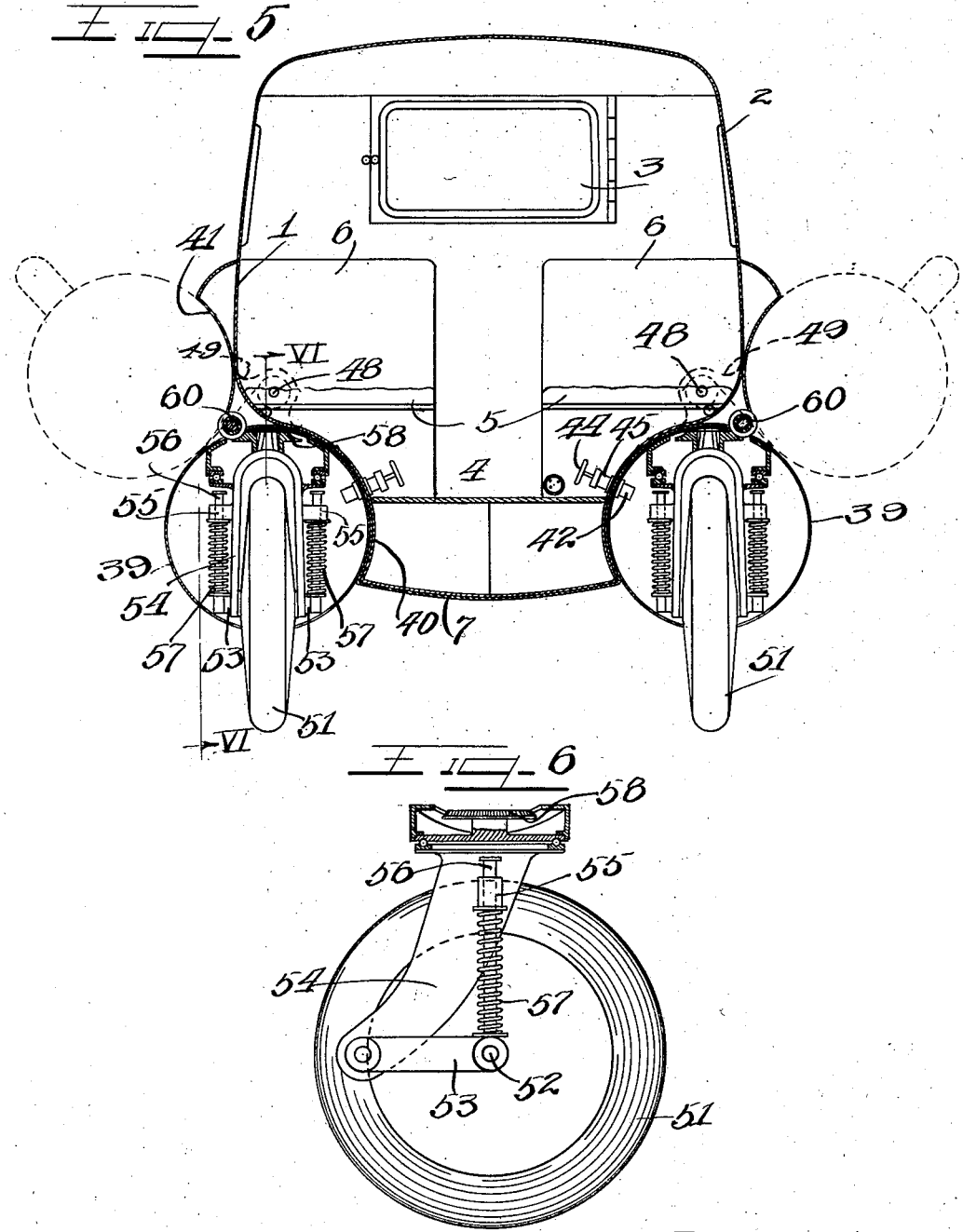

July 5, 1927.
A. E. COOK
AUTO MARINE VEHICLE
Filed Aug. 17, 1925
1,634,932
7 Sheets-Sheet 4
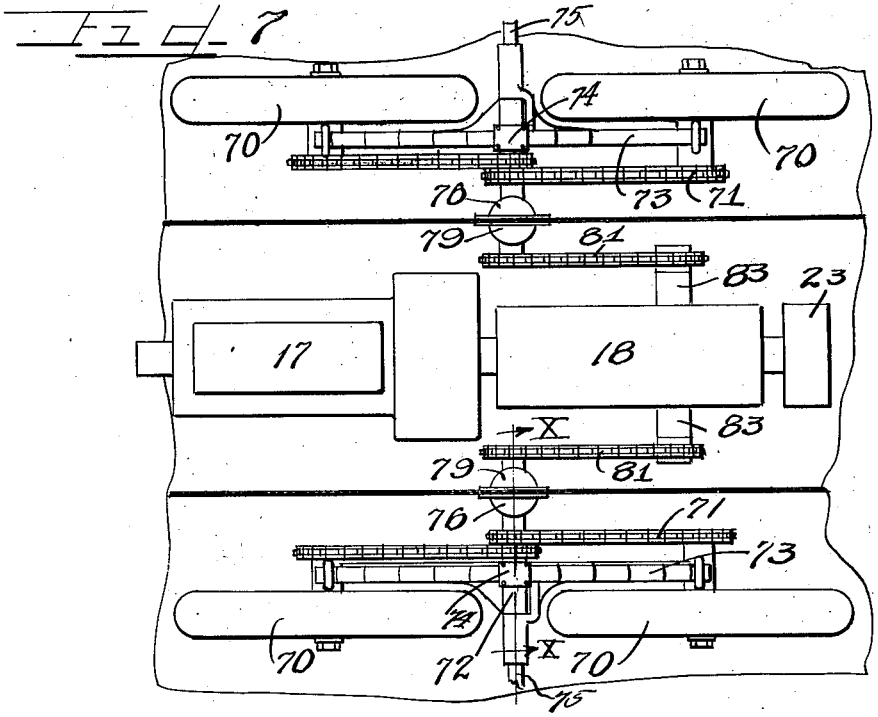
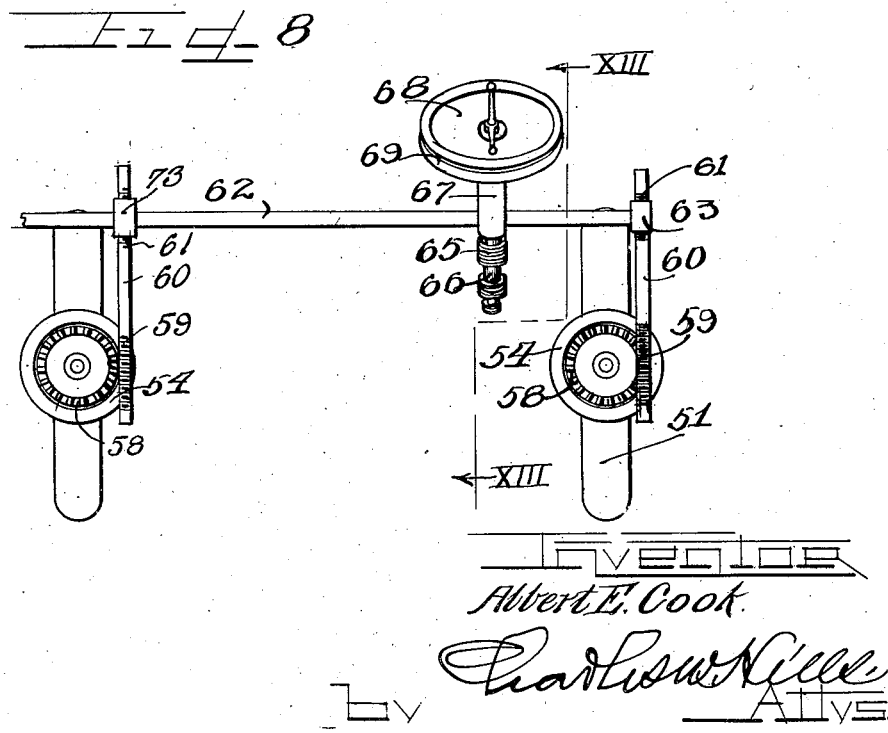
Inventor
Albert E. Cook July 5, 1927. 1,634,932
A. E. COOK
AUTO MARINE VEHICLE
Filed Aug. 17, 1925    7 Sheets-Sheet 5
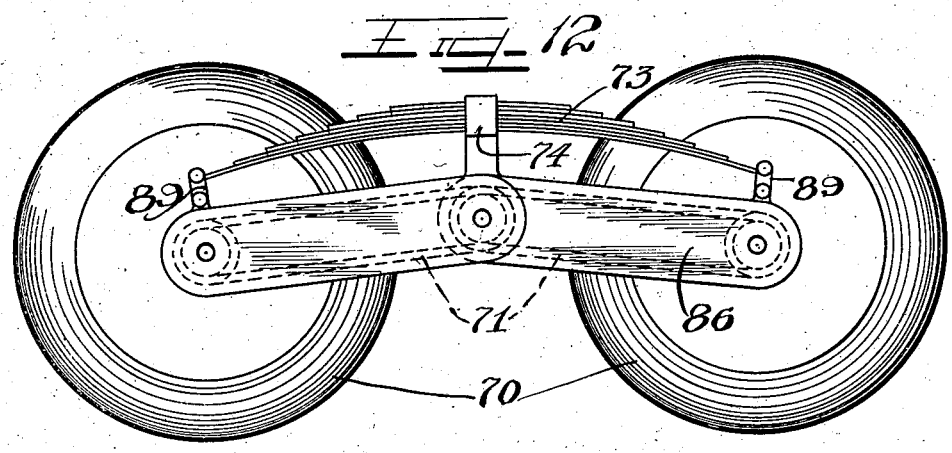
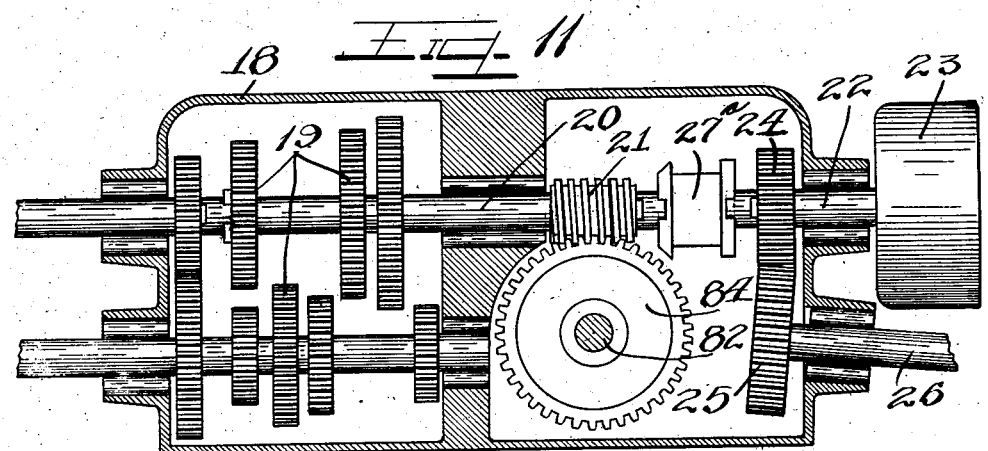
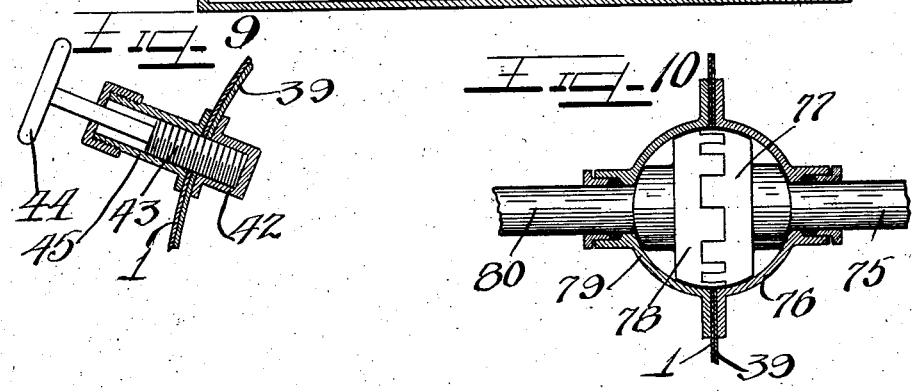

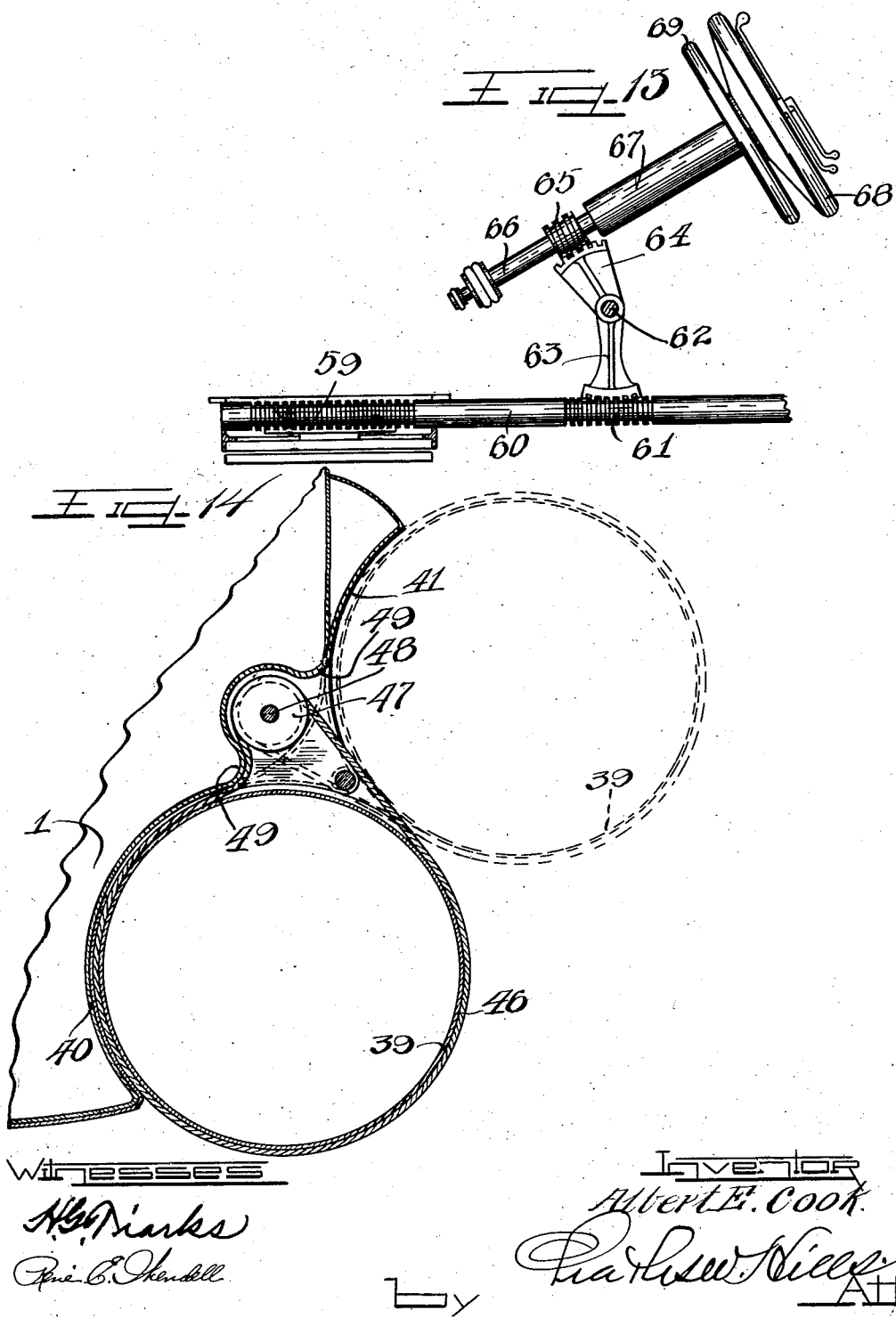

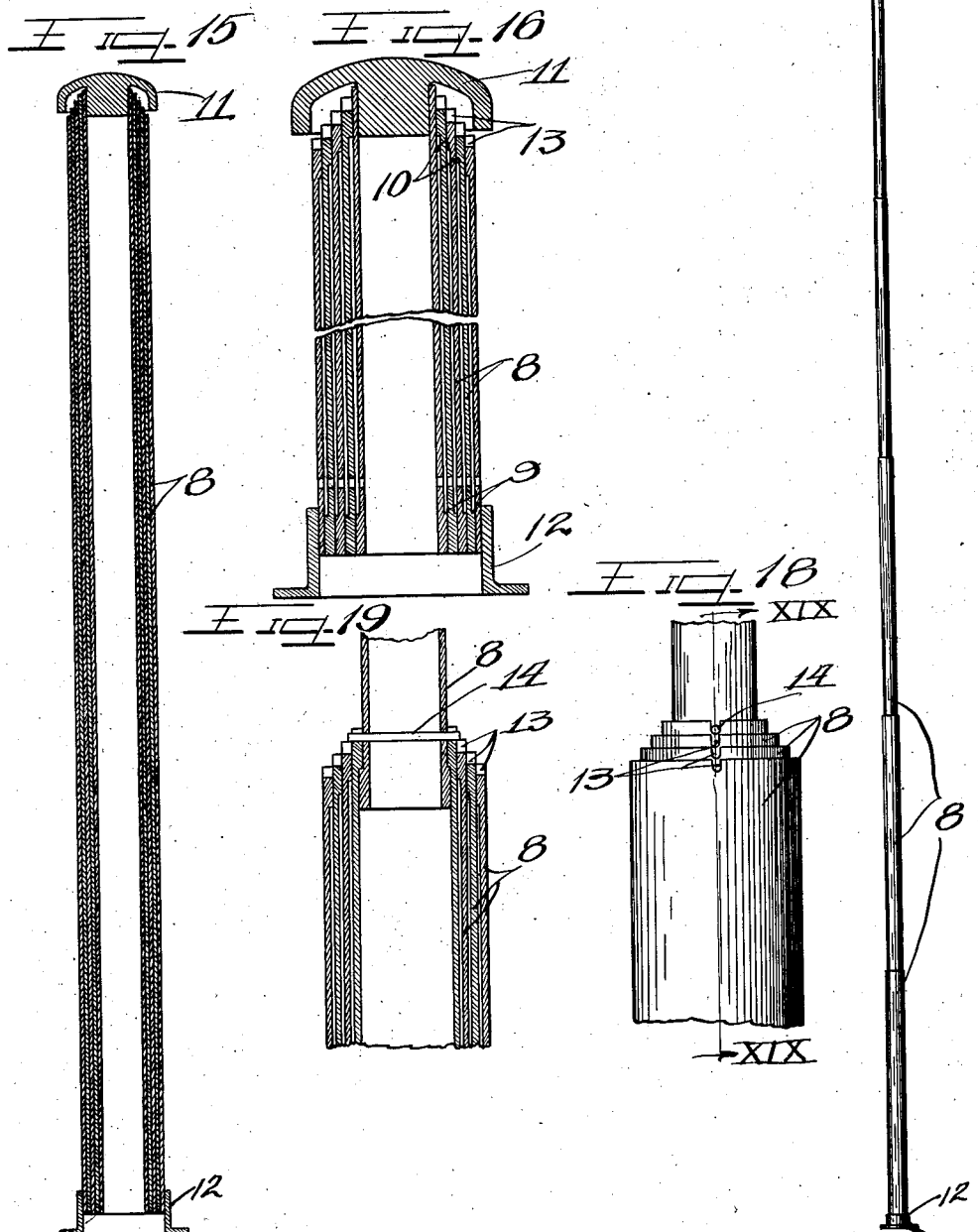

Patented July 5, 1927.

1,634,932

UNITED STATES PATENT OFFICE.

ALBERT E. COOK, OF EVANSTON, ILLINOIS, ASSIGNOR TO CHARLES B. COOK, OF CHICAGO, ILLINOIS.

AUTO MARINE VEHICLE.

Application filed August 17, 1925. Serial No. 50,732.

It is an object of this invention to provide an improved land and water vehicle constructed with an extensible body and with adjustable pontoons for varying the draft of the vehicle when used in the water.

It is also an object of this invention to provide an auto marine vehicle wherein the body portion is provided with a reversible bow member and with a pivoted stern member which carries the propeller mechanisms for driving the vehicle when used as a water craft.

It is a further object of this invention to provide an auto marine vehicle having the body thereof so constructed to permit the length of the vehicle to be readily increased for use in the water. It is a further object of this invention to provide an auto marine vehicle wherein the main body has movably supported thereon pontoon members constructed to carry the front steering wheels as well as the rear driving truck wheels of the vehicle.

It is furthermore an object of this invention to provide an improved land and water craft having an extensible body and adjustable pontoons, said pontoons supporting the steering wheels and the driving wheels of the vehicle, and furthermore being constructed to permit a driving connection from the driving mechanism to be transferred to the rear driving wheels of the vehicle when the pontoons are in their lowered position.

Another object of this invention is the construction of a land and water vehicle wherein an extensible body has pontoons pivotally mounted thereon, said pontoons carrying the front wheels of the vehicle and being constructed to coact with steering mechanisms operable from the steering wheel of the vehicle.

Still another object of this invention is the construction of a land and water vehicle wherein the main body has the rear portion thereof constructed to receive a propeller unit within a pocket, said propeller unit adapted to be swung outwardly and downwardly into a position to increase the length of the vehicle body and at the same time position the propeller mechanisms to receive a drive from the driving mechanism of the vehicle.

Another object of the invention is the construction of a land and water craft provided with a body section having a reversible bow member for increasing the length of the body section and a pivoted propeller section, said body section being provided with adjustable pontoons and with a telescoping mast.

It is an important object of this invention to provide an auto marine vehicle of improved and simplified construction carrying movably mounted pontoons as well as movable end sections whereby the length of the vehicle may be increased when used as a water craft.

Other and further important objects of this invention will be apparent from the disclosures in the specification and the accompanying drawings.

The invention (in a preferred form) is illustrated in the drawings and hereinafter more fully described.

On the drawings:

Figure 1 is a side elevation of an improved auto marine vehicle embodying the principles of this invention.

Figure 2 is a longitudinal section of the vehicle with parts in elevation showing the bow section reversed and the stern propeller section lowered to increase the length of the vehicle.

Figure 3 is a top plan view of the vehicle when used as a water craft showing the top in section.

Figure 4 is an enlarged fragmentary detail sectional view of the seating and sleeping apparatus taken on line IV—IV of Figure 3.

Figure 5 is an enlarged transverse section taken on line V—V of Figure 1 showing the raised position of the pontoons in dotted lines.

Figure 6 is a fragmentary detailed view of one of the steering wheels taken on line VI—VI of Figure 5 with parts omitted.

Figure 7 is an enlarged plan view of the rear driving wheel trucks connected to receive a drive from the power plant of the vehicle.

Figure 8 is a plan view of the steering mechanisms for the front wheels of the vehicle.

Figure 9 is an enlarged fragmentary detailed section taken on line IX—IX of Figure 3 and illustrating the means whereby the pontoons are held secured in position on the main body of the vehicle.

Figure 10 is an enlarged detailed section taken on line X—X of Figure 7 illustrating the clutch mechanism connecting the rear driving wheel trucks to the power plant of the machine.

Figure 11 is an enlarged longitudinal detail section taken on the line XI—XI of Figure 3 illustrating the transmission mechanism.

Figure 12 is an inner side elevation of the driving wheel truck for the vehicle.

Figure 13 is a fragmentary view of the steering wheel mechanism taken on the line XIII—XIII of Figure 8, with parts omitted.

Figure 14 is an enlarged fragmentary detail section through one of the pontoons taken on the line XIV—XIV of Figure 1, and illustrating the elevated position of the pontoons in dotted lines.

Figure 15 is an enlarged longitudinal section of the mast when in closed position, taken on the line XV—XV of Figure 2.

Figure 16 is an enlarged fragmentary detail section of the mast in closed position.

Figure 17 is an elevational view of the mast in its extended position.

Figure 18 is a fragmentary elevation of the mast with the uppermost section extended and held in position by means of a diametrical pin.

Figure 19 is a fragmentary detail section of the mast taken on line XIX—XIX of Figure 18.

As shown on the drawings:

The reference numeral 1 indicates a main body or hull provided with a watertight cover or top 2 having windows 3 as clearly indicated in Figures 1, 2 and 5 of the drawings. The interior of the housing 1 is provided with a raised or false floor 4 upon which are supported a plurality of cushion seats 5, each of which is provided with a hinged cushioned back 6 adapted to be swung downwardly into a horizontal position as indicated in Figure 4 to permit the seats 5 and the backs 6 thereof to form a couch or bed for reclining or sleeping purposes. Supported on the floor 7 of the vehicle at the middle portion of the front end of the interior section is a telescoping mast comprising a plurality of telescoping sections 8 of different diameters, the lower ends of which are provided with shoulders 9 (Figure 16) while the upper ends of said sections are provided with shoulders 10. The shoulders 9 and 10 serve as stops for the mast sections when in their extended position. The innermost section has rigidly secured within the upper end thereof a top cap 11 while the lower end of the outermost section is rigidly secured to a flanged base 12 which is secured to the floor 7 of the vehicle. Each of the telescoping mast sections is provided at its upper end with a pair of oppositely disposed notches 13 to receive pins 14 when the sections are in their extended positions, said pins 14 extending through apertures in the respective mast sections with the ends of said pins seating in the notches 13 as clearly illustrated in Figures 18 and 19 of the drawings.

The front end of the vehicle body 1 is provided with an open chamber adapted normally to receive a reversible front end section or bow section 15 securely seated therein to close the front end of the body 1 when the vehicle is used on land. Mounted within a chamber 16 provided in the rear portion of the body 1 is a driving motor 17 and a transmission housing 18 connected thereto. Mounted within the transmission housing 18 (Figure 11) are the transmission mechanism gears 19 adapted to operate the transmission shaft 20 on which a driving worm 21 is mounted. Journalled in the rear end of the transmission housing 18 is a fly wheel shaft 22 on the outer end of which a flywheel 23 is supported. Mounted on the inner end of the flywheel shaft 22 is a gear 24 which is in mesh with a lower gear 25. The gear 25 is supported on the inner end of an auxiliary or intermediate drive shaft 26 journalled in suitable bearings in the transmission housing 18. The transmission shaft 20 and the flywheel shaft 22 are adapted to be connected by means of a clutch mechanism 27ª.

The auxiliary shaft 26 has the rear end thereof projecting into a semi-spherical housing 27 which engages around a rear opening in the lower rear portion of the back wall of the body 1. A clutch member is mounted within the semi-spherical housing 27 on the projecting end of the intermediate shaft 26, similar to the arrangement illustrated in Figure 10. The intermediate shaft 26 is adapted to transmit a drive to a belt 28 (Figure 2) which in turn is adapted to drive a worm 29 meshing with a worm wheel 30. The worm wheel 30 is secured on a transverse shaft journalled within suitable bearings across the rear end of the vehicle body 1. The middle portion of the rear end of the vehicle is provided with a recess or pocket 31 within which is removably seated a rear body extension 32 secured to the transverse shaft driven by the worm wheel 30. The rear extension section 32 carries a propeller shaft 33 on which a propeller blade 34 is supported. The propeller shaft 33 projects into a semi-spherical housing 35 and has a clutch member secured on the end thereof within said semi-spherical housing 35. Any suitable control may be connected with the belt 28 driven by the intermediate shaft 26 to permit the rear extension section 32 to be moved from its closed position into its extended position as illustrated in Figure 2. The semi-spherical housing sections 27 and 35 are adapted to abut one another to permit the clutch mechanisms therein to coact with one another so that a drive from the intermediate shaft 26 is transmitted to the propeller shafting 33 and to the propeller 34. The rear extension section 32 carries a steering blade or rudder 36 which may be operated from the interior of the body 1 by means of a steering mechanism 37. Pivotally mounted by means of a hinge mechanism 38 on each side of the vehicle housing 1 is a longitudinally disposed pontoon 39 normally adapted when in its lower position to seat within a pontoon recess or pocket 40, one of which is formed on each side of the vehicle body 1. Each side of the body 1 is also provided with an upper pontoon recess or pocket 41 for receiving the respective pontoon when in its raised position. A plurality of retaining means for holding the pontoon in either their lowered or raised positions are provided within the vehicle body 1 and each of said retaining means comprises an internally threaded socket 42 rigidly secured within the pontoon 39 and adapted to removably receive a securing bolt 43 (Figure 9) operable by the means of a hand wheel 44. The retaining bolt is disposed within a sleeve or housing 45 carried within the body 1 of the vehicle. When the pontoon retaining bolts are retracted out of engagement with the sockets 42 of the pontoons said pontoons 39 are released and may be swung from their lowered positions illustrated in Figure 5 into their raised position as indicated in dotted lines. The pontoons 39 have engaged therearound endless belts 46 which are also trained around pulley members 47 supported on shafts 48 disposed longitudinally within the body 1. The shafts 48 controlling the operation of the pontoons are connected by suitable driving and control mechanisms 50 with the engine 17 to permit the pontoons when released to be either raised or lowered by the driving motor of the vehicle. As clearly illustrated in the detailed showing in Figure 14 each of the pockets 40 and 41 for the reception of the pontoons are provided with longitudinal ribs 49 over which the pontoon operating belts 46 are adapted to be engaged in order to take up slack in said belts when the pontoons are swung from one position to the other.

Mounted within a recess in the front end of each of the pontoons 39 is a front steering wheel 51, supported by means of a shaft 52, the ends of which are journalled in bearing collars formed on the ends of connecting links 53. The connecting links 53 have the other ends thereof pivotally connected to the lower ends of supporting fork 54 engaged over the wheel 51. Formed on both sides of each of the forks 54 are apertured projections 55 through which bolts 56 project. The lower ends of the bolts 56 are pivotally connected to the wheel shaft 52 and have springs 57 engaged thereon thereby affording a resilient connection between the front wheel 51 and the forks 54 as clearly illustrated in Figure 6. Mounted on top of each of the forks 54 is a bevelled gear 58 adapted to coact with a rack member 59. Formed on one end of a rack bar 60 is a rack member 61 (Figure 13). Supported transversely within the front part of the vehicle body 1 is a transverse shaft 62 on the ends of which gear segments 63 are secured. The gear segments 63 are positioned to coact with the rack members 61 of the rack bar 60. Secured to the transverse shaft 62 intermediate its ends is an upwardly directed gear segment 64, the teeth of which are in coacting relation with a worm 65 mounted on a steering wheel rod 66. The steering wheel rod is disposed within a steering wheel sleeve 67 supported by any suitable means in front of the driver's position in the vehicle. Mounted on the upper end of the steering wheel shaft is an upper steering wheel 68 governing the steering of the front wheel 51 and a lower steering wheel 69 adapted to be actuated for the purpose of operating the control mechanisms 37 which govern the rudder 36.

Each of the pontoons 39 is also provided with a suitable recess or pocket at the rear end thereof for the purpose of supporting a driving truck consisting of a pair of rear driving wheels 70, the shafts of which are connected to be driven by chains 71 operable through sprockets mounted on an intermediate shaft 75 positioned between each pair of wheels 70 within a shaft housing 72. As clearly illustrated in Figure 7 the chains which drive the wheels 70 are positioned adjacent the inner sides of said wheels while a leaf spring 73 is supported between the chains 71 and the wheels 70 on a bracket arm 74 carried on the sleeve 72. The ends of these leaf springs 73 are connected with the hubs of the respective wheels 70 by suitable toggles or links 89.

The intermediate shaft 75 within each of the sleeves 72 projects into a semi-spherical housing 76 secured within the interior of a pontoon. Mounted on the inner end of the shaft 75 within the respective housing 76 is a clutch member 77 (Figure 10) which coacts with a clutch member 78 disposed within a semi-spherical housing 79 mounted within the interior of the body 1 of the vehicle. The clutch member 78 is secured on the inner end of a stub shaft 80 driven by means of a chain 81. Both of the chains 81 are trained around sprockets which are secured on the outer ends of transverse shaft 82 (Figure 11) positioned within sleeves 83 formed on the sides of the transmission casing 18. Mounted upon the transverse shaft 82 within the transmission casing 18 is a worm wheel 84 adapted to be driven by the worm 21. When the pontoons are in their lowered position the driving trucks assume the position as illustrated in Figure 7 so that a drive from the transmission mechanism 19 within the casing 18 is transmitted through the coacting clutch members 77—78 to the respective chains 71 and the wheels 70, so that a drive from the motor 17 is transmitted to the driving wheels 70 in order that the vehicle may be driven on land.

Figure 12 is a side elevation of the driving wheel truck arrangement in which the rear driving chains 71 are shown mounted within their housings or casings 86.

The operation is as follows:

The improved auto marine vehicle when used on land is of a length substantially shorter than when the vehicle is used as a water craft, having the bow section extending and the propeller section lowered, as illustrated in Figure 2 to increase the overall length of the craft. When on land, the pontoons 39 are secured in their lowermost positions by means of the hand-operated retaining screws 43, so that the front steering wheels 51 and the rear truck wheels 70 are positioned to track on the ground.

The drive from the motor 17 is transmitted through the transmission gear mechanisms within the transmission casing 18 so that a drive is imparted to the shaft 82 which in turn drives the chains 81. The drive from the motor is thus imparted to the two clutch mechanisms positioned in the housings 76—79 and then to the chains 71 and the respective wheels 70. Steering of the vehicle is done by the steering wheel 68 which operates the worm 65 and the gear segment 64 (Figure 13). The gear segment 64 is adapted to rock the transverse shafts 62 to operate the gear segments 63 which in turn are adapted to shift the rack rod 60 so that the bevelled gears 68 are operated to cause steering of the front wheels 51.

When it is desired to use the auto marine vehicle as a water craft the front or bow section 15 is removed and inverted so that the same will project outwardly in front of the body 1. The propeller section 32 is swung from its pocket 31 outwardly and downwardly into the position illustrated in Figure 2 so that the clutch mechanisms 77 and 78 interfit with one another as illustrated in Figure 10. The drive from the transmission mechanisms is transferred to the shaft 26 and to the propeller shaft 33 through the clutch mechanism 77—78 thereby causing operation of the propeller 34. The lowering of the propeller section 32 is accomplished from the interior of the vehicle through a suitable control which operates the belt 28 and the worm 29, said worm being in operating relation with the worm wheel 30 which in turn controls the movement of the propeller section 32. It will thus be noted that the length of the vehicle is materially increased.

With the vehicle launched to serve as a water craft, the pontoons 39 being in their lowermost positions the center of bouyancy as well as the center of gravity of the vessel is lowered, affording a broad flotation surface so that the vessel will draw but little water and still be exceedingly stable.

When the clutch 27 (Figure 11) is moved into a forward position, the drive from the motor 17 and the transmission mechanisms is transmitted to the worm 21 and the worm wheel 84 so that the rear wheels 70 are operated. When, however, the vehicle is in the water to be used as a water craft, the clutch 27 is shifted to its rear position to coact with the gear 24 thereby causing the drive to the rear wheels 70 to be disconnected and transferred to the gear 25 and shaft 26 which in turn operates the propeller 34 through the clutch mechanism within the housing 27—35. The steering of the vessel is accomplished through the steering wheel 69 which in turn operates the steering mechanisms 37 and the rudder 36. It will thus be noted that the vessel is driven by means of the propeller 34 and is steered from the driver's position by operating the rudder 36. The pontoons being in their lowered position the vessel draws but little water and may be operated at a high rate of speed so that the vessel may actually plane over the surface of the water, owing to its light draft. If, however, it is desired to increase the stability of the vessel and to reduce rolling and pitching thereof in a rough or heavy sea, the pontoons 39 may be released from the interior of the hull 1, by releasing the retaining screws 43. The control clutch mechanism 50 (Figure 3) may be operated from the driver's position to cause a drive from the motor 17 to be transmitted to the shafts 48, whereby the endless belts 46 are operated to cause the pontoons 39 to be swung from their lower positions upwardly into the dotted line position shown in Figure 14. Attention is called to the fact that when the belts 46 are operated to swing the pontoons from the lower into their upper positions that the slack in said belts is taken up by means of the projections or ribs 49 as clearly illustrated in Figure 14. It will thus be noted that the pontoons have been swung from their lower positions into their upper positions as shown in dotted lines in Figure 5, with the front and rear wheels projecting upwardly at an angle. The pontoons when in their upper positions may be secured in place by hand-operated retaining screws 43 or other suitable means operable from the interior of the hull of the vessel. With the pontoons in their upper position it will be seen that the flotation surface is materially increased as is also the stability of the vessel, so that rolling and pitching thereof is reduced. The raising of the pontoons greatly increases the draft displacement of the vessel owing to the fact that the center of gravity is then considerably below the water line.

Attention is called to the fact that the adjustment of the pontoons as well as the operation of the propeller section may be accomplished from the interior of the vehicle or vessel and that the steering of the vessel may be done from the operator's position by means of the steering wheel 69. The windows and other means of access to the interior of the vessel are, of course, constructed to be watertight and may also be constructed so that the same may be opened when desired. Attention is called to Figures 15 to 19 inclusive which illustrate a telescoping mast for use in connection with the auto marine vehicle when the same is used as a vessel. The various sections of the mast may be elevated and held in extended position by means of the pins 14 as illustrated in Figure 19, thereby permitting the mast to be extended to any desired height within the range of the sections provided. The mast, when extended as shown in Figure 17, may be used as a means for connecting a sail to permit the vessel to be operated by the winds if desired, or in case the driving mechanisms of the vehicle are out of commission. The mast may also be used to carry a flag or other similar symbol, if so desired.

The interior of the vessel or vehicle is provided with a plurality of seats 5, the backs of which may be lowered into their dotted line positions as illustrated in Figure 4, to permit the seats to be converted into benches, couches, or beds, if desired.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. An auto marine vehicle comprising a body, pontoons movably mounted thereon, means for adjusting the pontoons, retaining means for holding the pontoons in their adjusted positions, driving means within said body, a reversible bow section for increasing the length of the vehicle, a housing pivoted to the rear end of the body to increase the length of the vehicle, and propeller means in said housing adapted to be connected to receive a drive from said driving means.

2. A land and water vehicle of the class described comprising a body, a reversible bow section at the front end of said body and a pivoted propeller section connected with the rear end of the body.

3. A land and water vehicle of the class described comprising a body, a propeller section pivotally connected to the rear end thereof, and means within the body adapted to be operated to cause the propeller section to be swung from an out-of-the-way position into an extending position, to increase the length of the vehicle.

4. In a land and water vehicle, the combination with a body section, of a reversible bow section at one end thereof for increasing the length of said body section, a stern section movably mounted on the other end of the body section, means operable from the interior of the body section for moving said stern section from a concealed position into an extended visible position, a propeller mechanism carried by said stern section, driving means within the body section adapted to operate said propeller mechanism, and a rudder mechanism carried by said stern section and operable from the interior of said body section.

5. In an auto marine vehicle of the class described, the combination with a body, of a stern section pivotally mounted thereon, a propeller mechanism carried by said stern section, means within the body for operating said propeller mechanism, a rudder device carried by said stern section, and means within the body for operating said rudder device.

6. In an auto marine vehicle of the class described, the combination with a body, of driving means therein, pontoons adjustably mounted on said body, steering wheels carried by said pontoons, means operable from the interior of the body for steering said steering wheels, a plurality of driving wheels carried by each of said pontoons, and means connecting said driving wheels with said driving means within the body to cause a drive to be imparted to said driving wheels.

7. In a land and water vehicle of the class described, the combination with a body, of pontoons pivotally supported thereon, steering wheels and driving wheels carried by said pontoons, means for operating the steering wheels and the driving wheels from the interior of said body, and mechanisms operable from the interior of the body to cause said pontoons to be moved into different positions to vary the draft of the vehicle when used as a water craft.

8. In an auto marine vehicle of the class described, the combination with a body, of pontoons and a stern section pivotally supported thereon, a driving means within the body, and means controlled from the interior of the body adapted to permit said pontoons and said stern section to be connected with said driving means to permit adjustment of said pontoons and said stern section.

9. In an auto marine vehicle of the class described, the combination of a body section, of a stern section pivotally supported thereon, means for operating said stern section from the interior of the body, and a rudder mechanism carried by said stern section also operable from the interior of the body.

10. In an auto marine vehicle of the class described, the combination with a body, of a reversible bow section in the front end of said body, a hinged stern section on the rear end of said body, a propeller mechanism carried by said stern section, driving means within said body, and clutch means for connecting said driving means with said propeller mechanism.

11. An auto marine vehicle comprising a body, pontoons pivotally supported thereon, driving means controlled from the interior of the body for moving said pontoons into different positions to vary the draft of the vehicle, steering wheels carried by said pontoons, a steering wheel mechanism within said body, and rack and gear means operable by the steering means and connected with said steering wheels to permit steering of the same from the interior of the body.

12. In an auto marine vehicle comprising a body, pontoons pivotally mounted thereon, means for adjusting said pontoons, steering wheels in said pontoons, fork members for supporting said steering wheels, ball bearings for said fork members, gears mounted on said fork members, rack members connected to coact with said gears, gear segments for operating said rack members, and steering means connected to operate said gear segments to permit said wheels to be properly steered.

13. In an auto marine vehicle of the class described, the combination with a body having pontoon pockets formed therein, of ribs formed on said body, pontoons pivotally mounted on said body adapted to seat in said pockets, belts engaged around said pontoons, means within the interior of the body to operate said belt to cause said pontoons to swing from one set of pockets to another, with said belts first engaging one set of said projections and then being moved into engagement with another set of said projections to permit the slack in said belts to be taken up.

14. In an auto marine vehicle of the class described, the combination with a body, of pontoons mounted thereon, endless means engaged around said pontoons, means for operating said endless means to cause the pontoons to be moved into different positions, and ribs formed on said body coacting with said endless means to take up slack therein.

15. In an auto marine vehicle of the class described, the combination with a body, of pontoons thereon, driving wheels carried by said pontoons, a stern section pivotally supported on said body, a propeller mechanism carried by said stern section, a driving means within said body, a transmission connected therewith, and a clutch mechanism connected with said transmission adapted to be adjusted to permit the drive from said driving means to be transmitted either to said driving wheels or to said propeller.

16. In an auto marine vehicle, the combination with a body having a pocket in the rear end thereof, a propeller section hingedly supported on the rear end of said body, and means for moving said propeller section into an out-of-the-way position within the pocket of said body.

In testimony whereof I have hereunto subscribed my name.

ALBERT E. COOK.